Jan. 23, 1968    R. D. WOODWORTH    3,365,003
SPRING HITCH FOR DISK HARROWS
Filed June 21, 1965    2 Sheets-Sheet 1

Inventor
Robert D. Woodworth
J K McNeil
Attorney

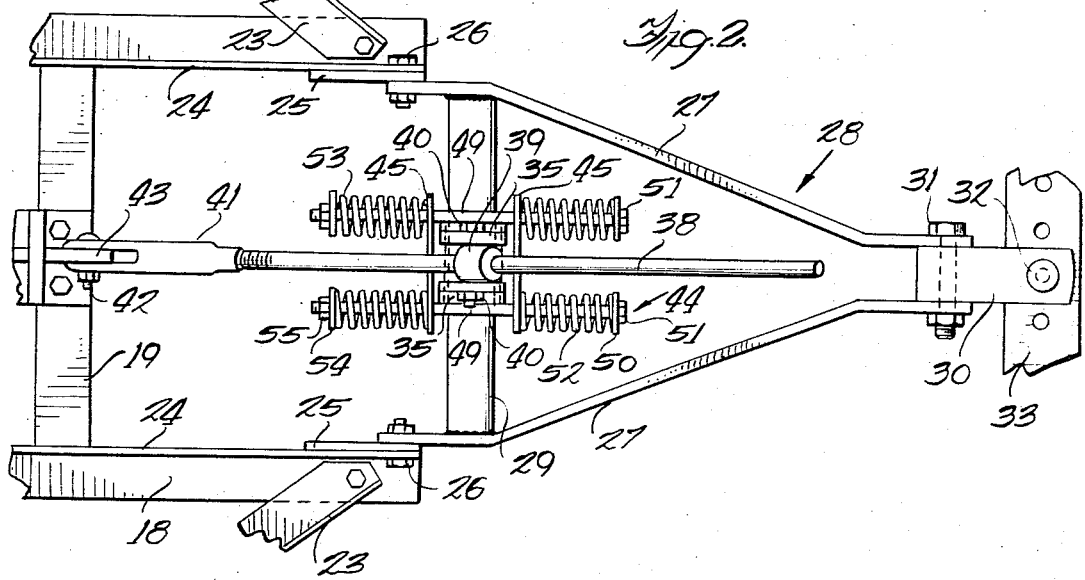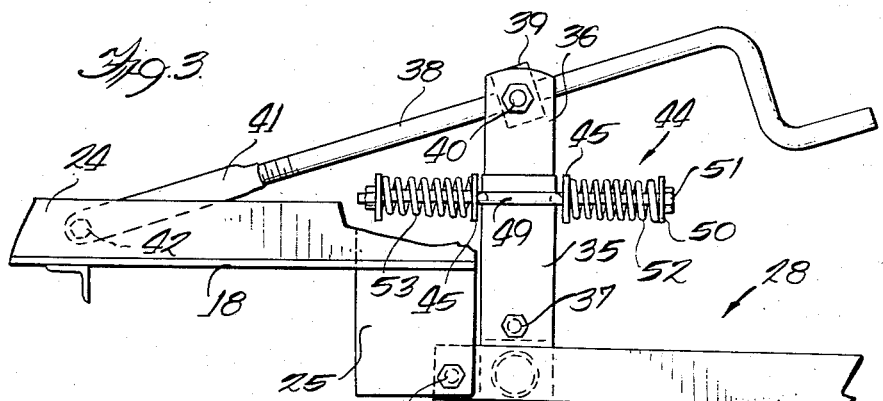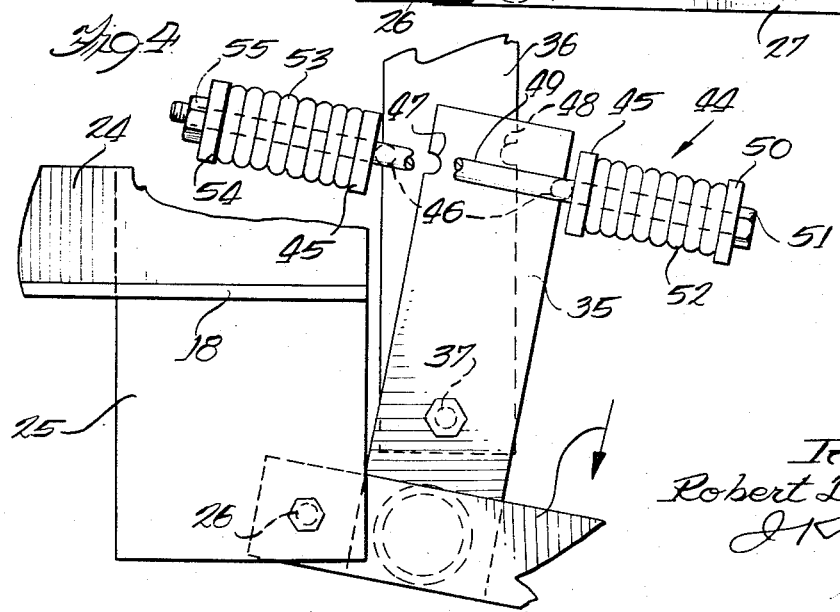

United States Patent Office 3,365,003
Patented Jan. 23, 1968

3,365,003
SPRING HITCH FOR DISK HARROWS
Robert D. Woodworth, Clarendon Hills, Ill., assignor to International Harvester Company, a corporation of Delaware
Filed June 21, 1965, Ser. No. 465,448
6 Claims. (Cl. 172—678)

ABSTRACT OF THE DISCLOSURE

A balancing spring arrangement between a vertically pivoted hitch structure and its tool-carrying frame to maintain the hitch structure in a neutral position with respect to the tool-carrying frame while yieldably opposing the pivoting of the hitch in either direction, wherein a pair of opposed springs are used, one of which operatively engages the frame and the other the hitch structure, and wherein the cushioning action of both springs is utilized to oppose the pivoting of the hitch structure in either direction.

---

This invention relates to implements and particularly to agricultural implements such as disk harrows adapted to be propelled by a tractor.

A disk harrow of the type with which this invention is concerned should be allowed to follow the contour of the ground, and this is facilitated by providing a hitch frame between the disk supporting frame and the tractor which is pivoted to the disk frame for movement in a vertical plane against the action of springs tending to balance the hitch frame in a normal neutral position in operation and to minimize bouncing of the disk frame in transport. In the past, such cushioning devices have been expensive as well as inefficient, and where springs have been used to cushion the pivoting hitch in each direction, one spring has opposed rather than aided the action of the other. Therefore, an object of this invention is the provision of an improved spring-loaded hitch for disk harrows and the like.

Another object of the invention is the provision of improved balance spring means for a disk harrow having a vertically pivotable hitch frame wherein the entire cushioning action of the springs is utilized in opposing vertical swinging of the hitch frame relative to the disk supporting frame in both directions.

Other objects and advantages of the invention will become clear from the following detailed description when read in conjunction with the accompanying drawings wherein:

FIGURE 2 is a plan view on an enlarged scale of a portion of the structure shown in FIGURE 1;

FIGURE 3 is a view in side elevation of a portion of the structure shown in FIGURE 2; and FIGURE 4 is an enlarged detail of a portion of the structure shown in FIGURE 3, illustrating relative movement between the parts.

Figure 1:
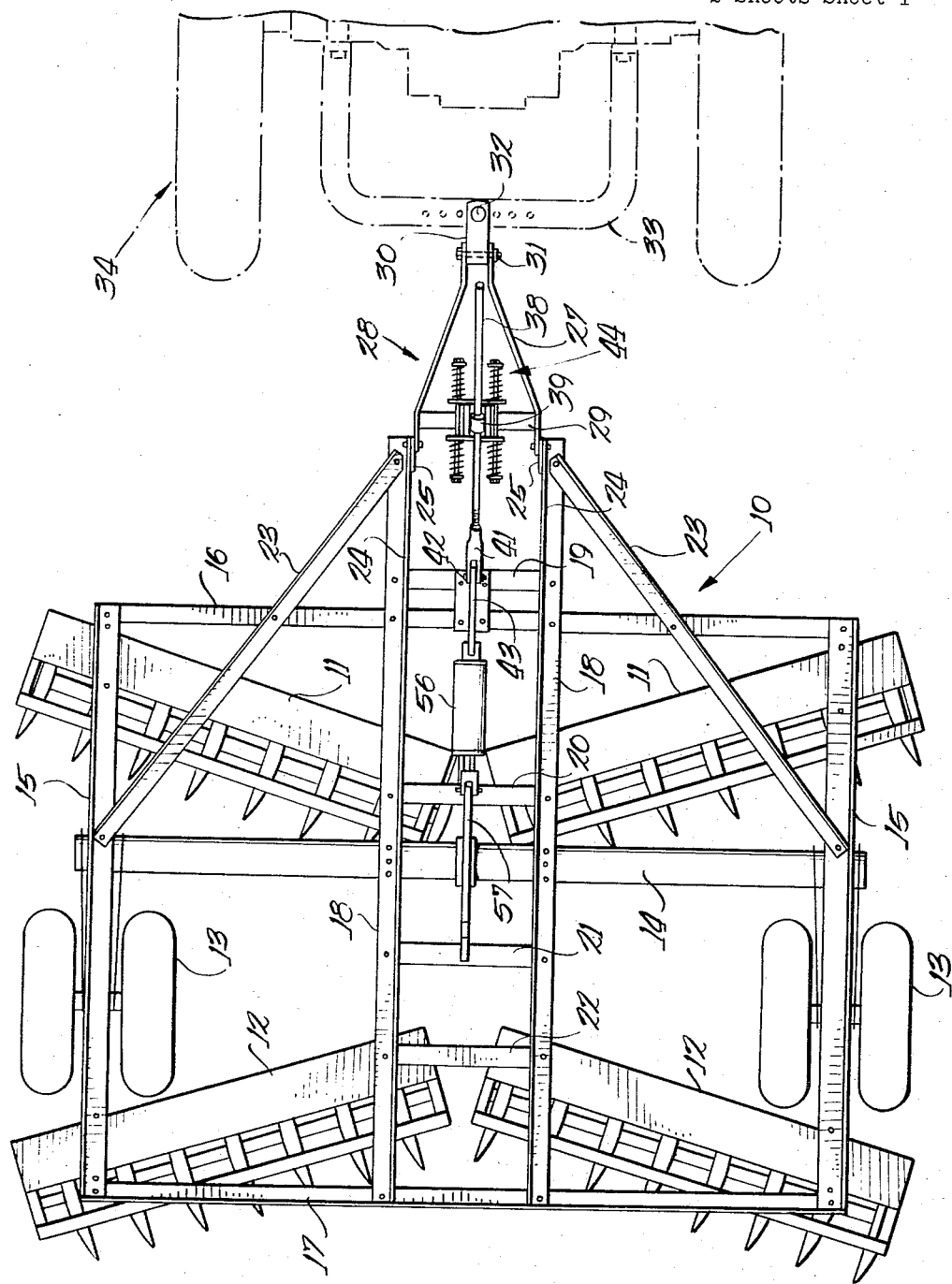
FIGURE 1 is a plan view of a tandem disk harrow incorporating the features of this invention.

In the drawings the numeral 10 designates a generally rectangular supporting frame having mounted thereon front and rear pairs of disk gangs 11 and 12, respectively. The disk gangs are illustrated diagrammatically, and it may be understood that the invention is applicable to implements of this type having other earthworking tools.

The frame 10 is mounted on laterally spaced pairs of wheels 13 utilized for gauging, and in transport, carried by a transverse shaft 14.

The supporting frame 10 comprises laterally spaced bars 15 and front and rear transverse connecting bars 16 and 17. A pair of laterally spaced angle bars or rails 18 are secured to bars 16 and 17 centrally thereof and project forwardly of the latter as shown in FIGURE 1. The forward ends of rails 18 are connected by cross-braces 19, 20, 21 and 22 and are further braced by forwardly converging members 23.

Rails 18 are provided with vertically extending flanges 24 to which are affixed depending plates 25 upon the lower ends of which are mounted, by pivot bolts 26, the rear ends of the laterally spaced arms 27 of a hitch member or frame 28.

A cylindrical shaft 29 extends between and is affixed to the rear portions of arms 27, the forward ends of the latter converging to receive therebetween a clevis 30 mounted upon a pivot pin 31 carried by hitch member 28 and pivotally connected to a hitch pin 32 carried by the drawbar 33 of a tractor 34.

Hitch member 28 includes an arm 35 formed of spaced members affixed to the cylindrical cross-member or shaft 29 disposed, in a normal neutral position of the hitch member, alongside and in transverse alignment with an upright member 36 including laterally spaced elements engaging the inner faces of the respective members 35.

The lower ends of the elements of upright 36 are pivotally mounted on bolts 37 carried by arm 35, and upright 36 is adjustably secured to the frame 10 by means of a crank 38 rotatably mounted in a swivel 39 carried by trunnions 40 at the upper end of upright 36. Crank 38 is threaded for reception in a threaded sleeve 41 pivotally connected by a bolt 42 to a bracket 43 mounted on brace 19 and forward bar 16. Thus, when hitch member 28 swings about pivots 26 arm 36 swings with it but the upper end thereof is held against substantial horizontal movement by its connection to the frame 10 through crank 38. Therefore, when hitch member 28 swings downwardly, for example, about its pivots 26, arm 35 swings forwardly relative to arm 36 about the axes of bolts 37 to a position such as is indicated in FIGURE 4.

Arm 35 and upright 36 are clamped together in a neutral position such as is indicated in FIGURE 3 by a spring cushion assembly indicated at 44 and comprising a pair of longitudinally spaced plates or bars 45, each of which has affixed thereto, as by welding, a cylindrical bar 46 receivable in notches 47, shown in FIGURE 4, in arms 35, and in notches 48 in th edges of upright 36, restraining bars 45 from displacement vertically relative to arm 35 and upright 36.

In the neutral position of FIGURE 3, plates or bars 45 are thus in operative engagement with opposite sides, forwardly and rearwardly of both arm 35 and upright 36. The ends of plates 45 are provided with apertures to slidably receive a pair of rods 49 disposed on laterally opposite sides of arm 35.

A washer 50 is mounted on each rod 49 at one end thereof and is held against displacement therefrom by a bolthead 51. On each rod 49 a coil spring 52 engages bar 45 at one end and a washer 50 at the other, and another coil spring 53 is mounted on the other end of each rod 49 and is engageable at one end with the adjacent bar 45, and at its other end with a washer 54, rod 49 being threaded to receive a nut 55 by which the springs 52 and 53 are retained and the tension thereon adjusted.

In order to adapt the hitch structure 28 to the height of the tractor drawbar 33 above the ground, the hitch is adjusted vertically about the pivots 26 by manipulating crank 38. In operation, a force tending to swing the forward end of the implement frame 10 upwardly about the points of contact of wheels 13 with the ground, causes hitch member 28 to swing downwardly in a clockwise direction as viewed in FIGURE 4, against the action of springs 52 and 53. In such case, arm 35 bearing against one of the plates 45 compresses spring 52 against washer 50, and the other plate 45 is immobilized against part 36 while the rods 49 are moved forwardly, thus compressing spring 53 between washer 54 and the associated plate 45. Thus, all of the springs 52 and 53 are compressed simultaneously to provide uniform and efficient cushioning action tending to return arm 35 and upright 36 to their normal aligned relation.

It is believed that the construction and operation of the novel spring hitch mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In an implement having a supporting frame, a hitch member pivotally mounted on said frame for swinging in a vertical plane relative thereto, and cushioning means yieldably opposing vertical movement of said hitch member to opposite sides of a selected neutral position, comprising an upright pivotally connected at its lower end to said hitch member on a transverse axis and having means securing it at its upper end to said frame, an arm affixed to said hitch member disposed alongside said upright and swingable forwardly and rearwardly relative thereto upon vertical movement of the hitch member, and a spring assembly for yieldably holding said upright and said arm against relative movement including a pair of longitudinally spaced plate members engageable with opposite sides of said upright and said arm and having apertures therein, a pair of laterally spaced rods slidably received in said apertures, and coil springs surrounding the ends of said rods and engageable with said plates, all of said springs being simultaneously compressible upon swinging said arm in either direction.

2. The invention set forth in claim 1, wherein means are provided on said rods for adjusting the tension on said springs.

3. The invention set forth in claim 2, wherein said means securing the upright to the frame comprises an extensible member adjustable to move said hitch member vertically and vary its position relative to the frame.

4. In an implement having a supporting frame, a hitch member pivotally mounted on said frame for swinging in a vertical plane relative thereto, an arm affixed to said hitch member and swingable therewith, a part disposed alongside said arm and at least partially carried by said frame, said arm being swingable with said hitch member relative to said part, cushion spring means associated with said part and said arm including a rod slidable relative to said part and said arm, a coil spring on each end of said rod at opposite sides of and operatively engageable with said part and said arm to yieldably resist the movement of said arm relative to said part, one of said springs being compressible against said part and the other spring being compressible by said arm upon swinging the latter relative to said part.

5. The invention set forth in claim 4, wherein said part is pivotally connected at one end to said hitch member and is secured at its other end to said supporting frame.

6. The invention set forth in claim 5, wherein said other end of said part is secured to the supporting frame by adjustable means adapted to vary the vertical position of said hitch member relative to the supporting frame.

References Cited

UNITED STATES PATENTS 3,193,306  7/1965  Pettit _____ 280—489

FOREIGN PATENTS 519,702  1/1921  France.

ABRAHAM G. STONE, *Primary Examiner.*

A. E. KOPECKI, *Assistant Examiner.*